(12) United States Patent
Lee

(10) Patent No.: US 10,547,718 B2
(45) Date of Patent: Jan. 28, 2020

(54) MOBILE TERMINAL

(71) Applicant: LG ELECTRONICS INC., Seoul (KR)

(72) Inventor: Haklim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,313

(22) PCT Filed: Nov. 9, 2015

(86) PCT No.: PCT/KR2015/012011
§ 371 (c)(1),
(2) Date: Jan. 5, 2018

(87) PCT Pub. No.: WO2017/007076
PCT Pub. Date: Jan. 12, 2017

(65) Prior Publication Data
US 2018/0198899 A1 Jul. 12, 2018

(30) Foreign Application Priority Data
Jul. 7, 2015 (KR) .......... 10-2015-0096507

(51) Int. Cl.
H04M 1/02 (2006.01)
H04B 1/3888 (2015.01)
(52) U.S. Cl.
CPC ........ *H04M 1/0266* (2013.01); *H04B 1/3888* (2013.01)

(58) Field of Classification Search
CPC .... H04M 1/02; H04M 1/0266; H04M 1/0208; H04B 1/3838; H04B 1/3888; H04B 1/40; G09F 9/00; G09F 9/33; H05K 1/00; G06F 3/041; G06F 3/01; G06F 3/0412
See application file for complete search history.

(56) References Cited

U.S. PATENT DOCUMENTS

| | | | |
|---|---|---|---|
| 8,860,656 B1 * | 10/2014 | Cho | G06F 3/041 345/102 |
| 9,560,750 B2 * | 1/2017 | Lee | H04M 1/0202 |
| 9,626,938 B2 * | 4/2017 | Abe | G09G 5/363 |
| 10,001,809 B2 * | 6/2018 | Seo | G06F 3/041 |

(Continued)

FOREIGN PATENT DOCUMENTS

| | | |
|---|---|---|
| CN | 104732890 A | 6/2015 |
| EP | 1912416 A2 | 4/2008 |

(Continued)

*Primary Examiner* — Thanh C Le
(74) *Attorney, Agent, or Firm* — Birch, Stewart, Kolasch & Birch, LLP

(57) ABSTRACT

A mobile terminal including a flexible display; an intermediate case including an opening; an internal case within the intermediate case for rolling the flexible display in and out of the intermediate case through the opening; a first case covering one end of the intermediate case; a second case covering the other end of the intermediate case; a first magnetic member provided within an interior of the intermediate case; and a plurality of second magnetic members provided under the flexible display such that the flexible display is rolled by an attractive force between the plurality of second magnetic members and the first magnetic member.

19 Claims, 17 Drawing Sheets

(56) References Cited

U.S. PATENT DOCUMENTS

| | | | |
|---|---|---|---|
| 2003/0109286 A1* | 6/2003 | Hack | H04M 1/0208 |
| | | | 455/566 |
| 2008/0013292 A1 | 1/2008 | Slikkerveer et al. | |
| 2011/0227855 A1 | 9/2011 | Kim et al. | |
| 2013/0314762 A1 | 11/2013 | Kwack et al. | |
| 2014/0321073 A1 | 10/2014 | Hong et al. | |
| 2014/0362512 A1* | 12/2014 | Hinson | G06F 15/025 |
| | | | 361/679.21 |
| 2016/0231843 A1* | 8/2016 | Kim | G06F 3/0412 |
| 2017/0169741 A1* | 6/2017 | Lim | G09F 9/00 |

FOREIGN PATENT DOCUMENTS

| | | |
|---|---|---|
| EP | 2837990 A2 | 2/2015 |
| KR | 10-0818170 B1 | 4/2008 |
| KR | 10-2010-0041733 A | 4/2010 |
| KR | 10-2014-0101611 A | 6/2014 |
| KR | 10-2014-0091273 A | 7/2014 |
| WO | 2009/067010 A2 | 5/2009 |

* cited by examiner

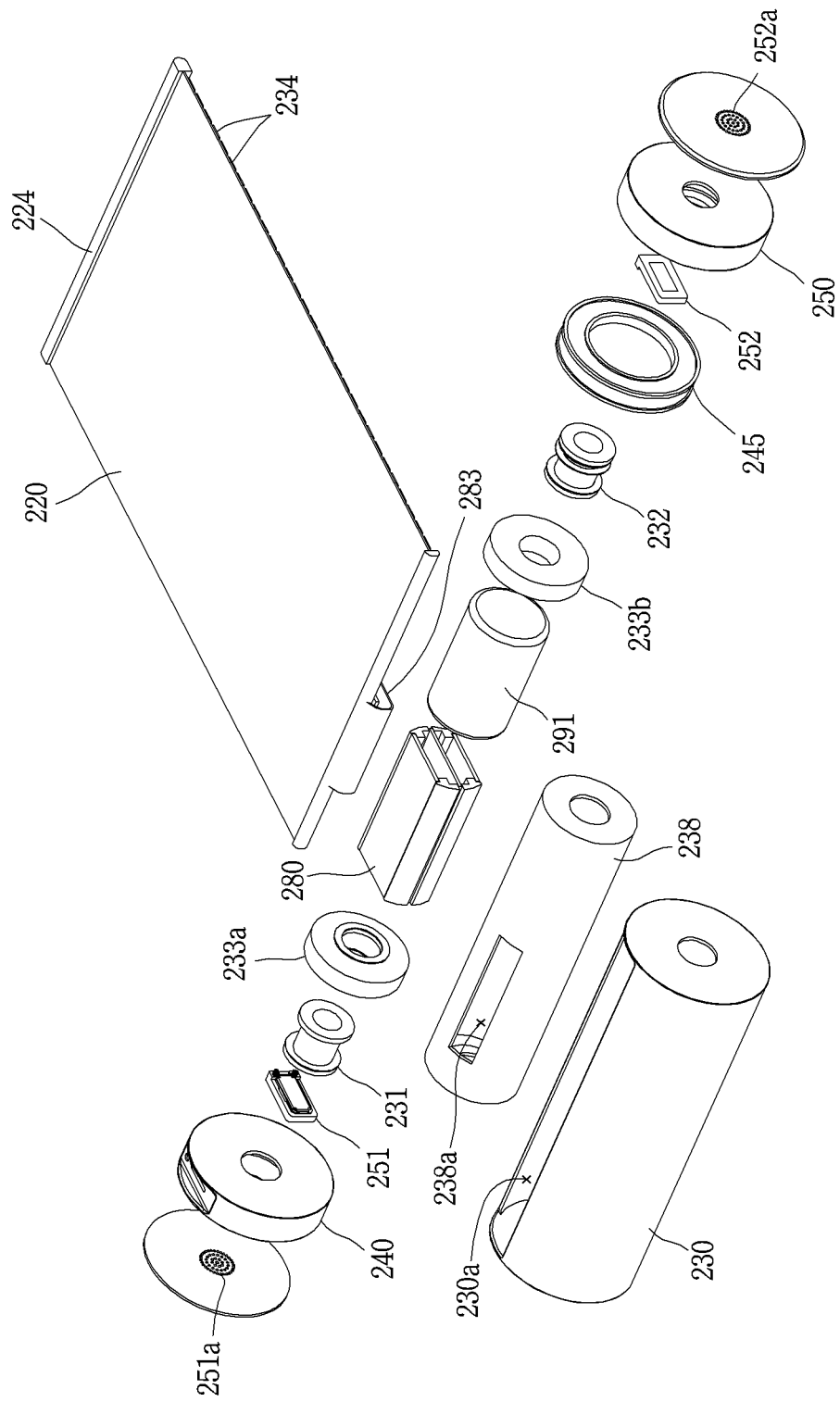

MOBILE TERMINAL

CROSS-REFERENCE TO RELATED APPLICATIONS

This application is the National Phase of PCT International Application No. PCT/KR2015/012011, filed on Nov. 9, 2015, which claims priority under 35 U.S.C. § 119(a) to Patent Application No. 10-2015-0096507, filed in Republic of Korea on Jul. 7, 2015, all of which are hereby expressly incorporated by reference into the present application.

TECHNICAL FIELD

The present invention relates to a mobile terminal in which a size of a displayed screen is adjusted by a user.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the mobile terminal becomes multifunctional, it is implemented as a multimedia player having complicated functions such as capturing images or videos, playing music or videos, playing games, and receiving broadcastings.

Various attempts have been made to implement complicated functions in such a multimedia device by means of hardware or software.

However, a display region of the related art mobile terminal is fixed, and thus, always has a fixed size. For this reason, the mobile terminal having a fixed size is inconvenient to carry. Particularly, a mobile terminal formed of a solid material is more inconvenient to carry.

SUMMARY OF THE INVENTION

The present invention is for the purpose of solving the above-described problem and another problem. Another object is for the purpose of providing a mobile terminal in which a display region displaying a screen can be easily adjusted by a user.

According to one aspect of the present invention for achieving another object, provided may be a mobile terminal which includes a body part, various electronic elements being embedded into the body part, and a display unit accommodated into the body part in a first state and exposed to the outside of the body part in a second state, wherein the body part includes: an intermediate case having a hollow type, a first magnetic member being provided in the intermediate case; and a first case and a second case provided on and under the intermediate case and separated from the intermediate case, and a plurality of second magnetic members are provided under the display unit along a first direction to have the same polarity and are spaced apart from one another, and the display unit is rolled by an attractive force between the plurality of second magnetic members and the first magnetic member.

According to one aspect of the present invention, an internal case having a concentric circle with the intermediate case may be provided in the intermediate case, and the display unit is rolled along an outer circumference surface of the internal case, and the display unit may be rolled to the inside or the outside of the intermediate case through a first cut groove which is provided in the intermediate case along a second direction.

According to one aspect of the present invention, the mobile terminal may further include: a first shaft provided between the first case and the intermediate case; and a second shaft provided between the second case and the intermediate case, wherein the first shaft and the second shaft may have a cylindrical shape where both ends are open.

According to one aspect of the present invention, one end of the first shaft may be fixed to the first case, and one end of the second shaft is fixed to the second case.

According to one aspect of the present invention, the first magnetic member may be provided on an outer circumference surface of each of the first and second shafts.

According to one aspect of the present invention, the second magnetic member may have polarity different from polarity of the first magnetic member, and are provided in plurality along the first direction.

According to one aspect of the present invention, a plurality of first projections may be provided on an outer circumference surface of the internal case, a plurality of second projections may be provided on an inner circumference surface of the intermediate case and are respectively coupled to the plurality of first projections, and the first and second projections may be concave-convex coupled to each other.

According to one aspect of the present invention, one end of the first projection may protrude from the outer circumference surface of the internal case, another end may be bent from the one end to the internal case and may be spaced apart from the internal case, and the first projection may be provided to have an elastic force.

According to one aspect of the present invention, two or more hall sensors may be provided in the internal case along a circumference direction of the internal case and sense a variation of a magnetic force in the circumference direction of the internal case.

According to one aspect of the present invention, two or more hall sensors may be provided in the internal case along a radius direction of the internal case and may sense a variation of a magnetic force in the radius direction.

According to one aspect of the present invention, the hall sensor may calculate a size of a region of the display unit exposed to the outside, and a screen may be displayed at a screen ratio suitable for the calculated size of the region of the display unit.

According to one aspect of the present invention, a circuit board and a battery may be provided in the intermediate case, a plurality of elements may be embedded into the first case and the second case, and the plurality of elements may be electrically connected to the circuit board by first and second flexible circuit boards provided along the inside of the first and second shafts.

According to one aspect of the present invention, first and second speakers may be respectively provided in the first and second cases.

According to one aspect of the present invention, a recessed portion including a planar surface may be provided on a surface of the first case or the second case, and a camera and a sound output unit may be provided in the recessed portion.

According to one aspect of the present invention, a sheet where the plurality of second magnetic members are provided may be provided on a bottom of the display unit and may include silicon or thermoplastic poly urethane (TPU).

According to one aspect of the present invention, the first magnetic member may be long provided on an inner circumference surface of the internal case in a cylindrical shape along the second direction.

According to one aspect of the present invention, a first holder may be provided in an inner end of the display unit along the second direction and is fixed to the internal case, and a second holder may be provided in an outer end of the display unit along the second direction and is hanged on the intermediate case.

According to one aspect of the present invention, the circuit board may include two or more boards, and the boards may be electrically connected to each other by a flexible connection part.

According to one aspect of the present invention, a third flexible circuit board may be connected to an inner end of the display unit, and a second cut groove may be provided in the internal case along the second direction and is electrically connected to the circuit board through the second cut groove.

According to one aspect of the present invention, an antenna may be provided in the first case or the second case.

Effects of a mobile terminal and a control method thereof will be described below.

According to at least one of embodiments of the present invention, there is an advantage where a region of a display unit exposed to the outside can be easily adjusted.

Moreover, according to at least one of embodiments of the present invention, since a rotor included in a body part rotates, there is an advantage where a position of a camera or the like exposed to the outside is changed.

Moreover, according to at least one of embodiments of the present invention, since a plurality of magnetic members provided under the display unit have the same polarity, there is an advantage where the display unit is flatly maintained.

Moreover, according to at least one of embodiments of the present invention, since a rotational force is generated by a magnetic member included in the body part, electrical devices can be freely disposed inside the body part, continuous rotation based on a magnetic force of each of the magnetic members provided between the body part and the display unit is automatically performed, and thus, there is an advantage where a separate for rolling the display unit is unnecessary.

Moreover, according to at least one of embodiments of the present invention, since a plurality of hall sensors are disposed along a circumference direction or a radius direction inside the body part, an exposed region of the display unit may be calculated, and thus, there is an advantage where a screen is displayed by adjusting a screen ratio so as to suitable for the calculated display region exposed to the outside.

An additional range to which the present invention is capable of being applied will be clarified from the detailed description. However, various modifications and corrections within the spirit and scope of the present invention can be clearly understood by those skilled in the art, and thus, it should be understood that the detailed description and a preferable embodiment of the present invention are merely provided as an example.

BRIEF DESCRIPTION OF THE DRAWINGS

FIG. 4 is an exploded perspective view of a mobile terminal according to an embodiment of the present invention.

DETAILED DESCRIPTION OF THE EMBODIMENTS

Figure 1A:
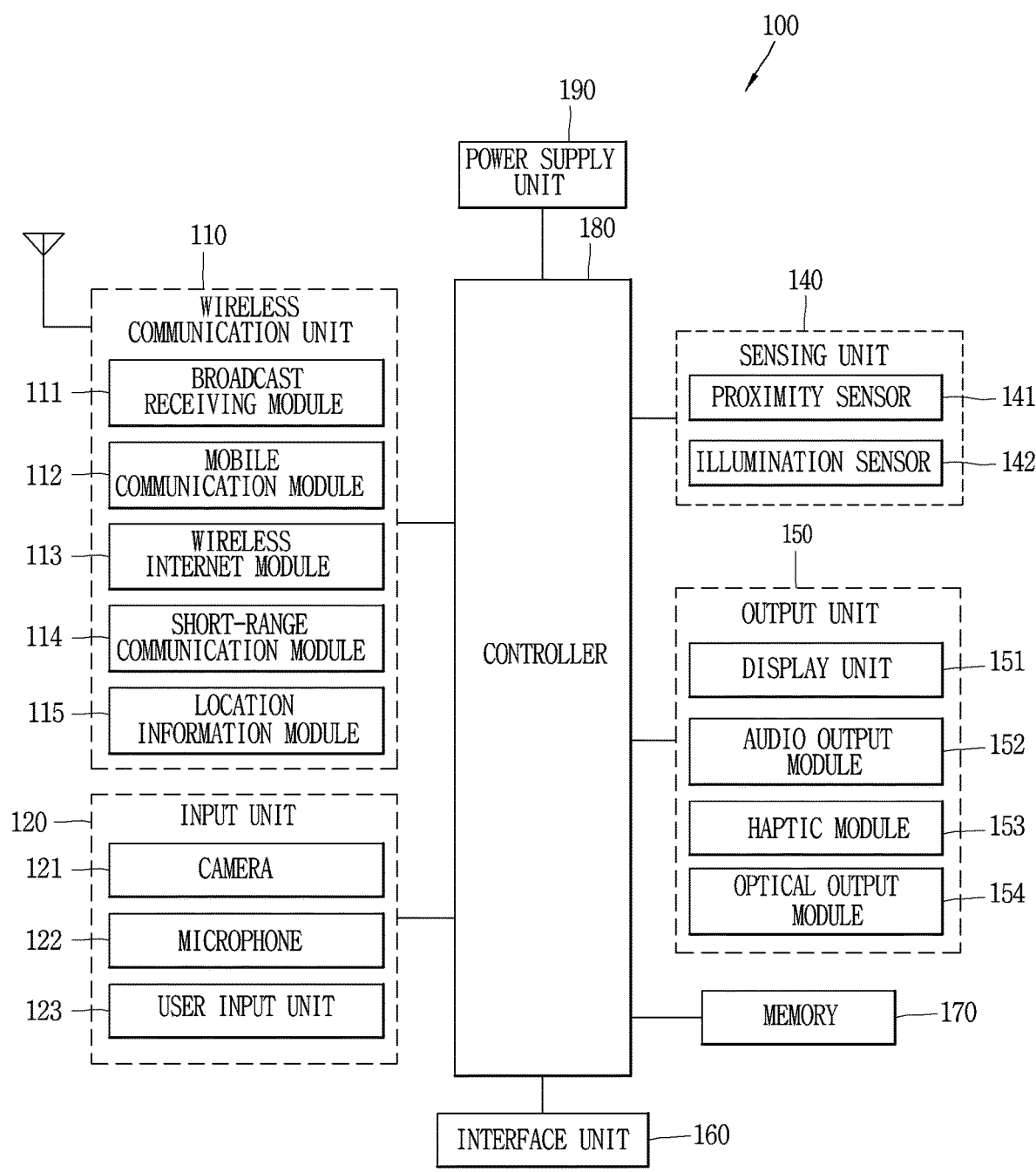
FIG. 1A is a block diagram for describing a mobile terminal relevant to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit"

may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
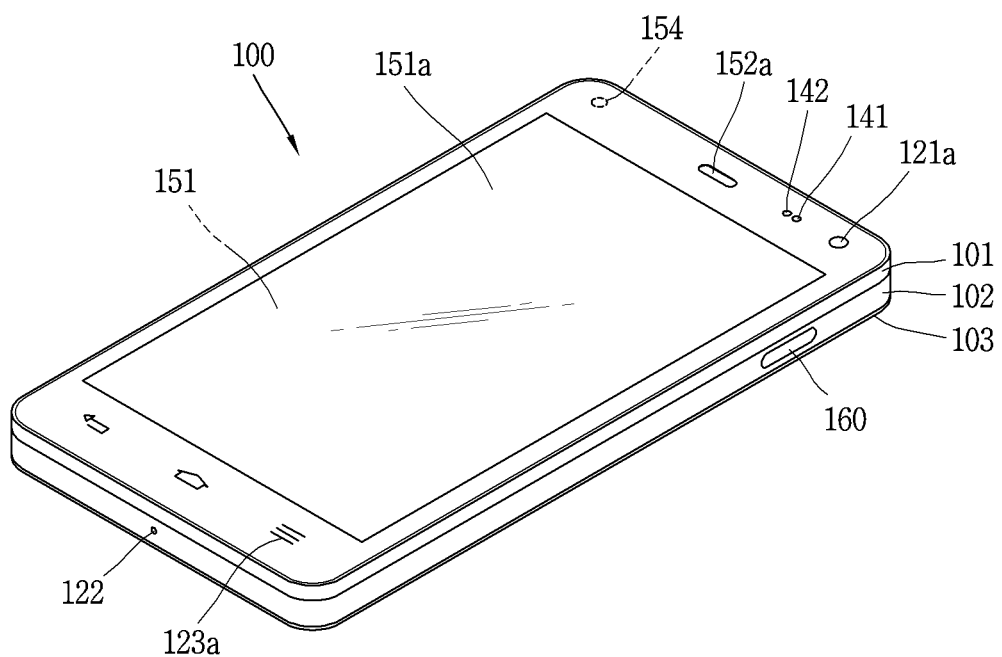
FIGS. 1B and 1C are conceptual views when an example of a mobile terminal relevant to the present invention is seen in different directions.
Figure 1C:
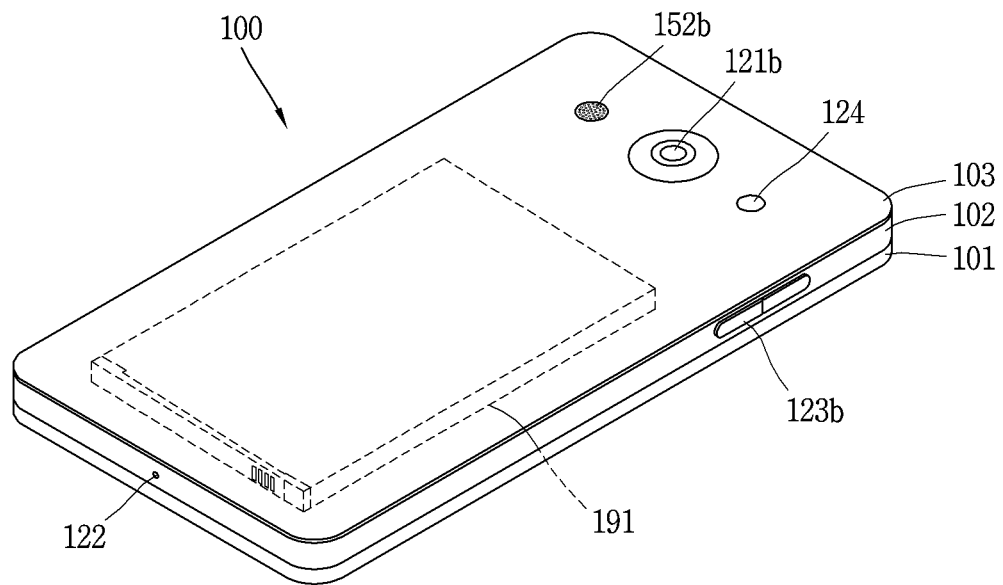

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

The controller 180 controls some or all of the components illustrated in FIG. 1A in order to drive an application program stored in the memory 170. Further, the controller 180 may operate at least two of the components of the mobile terminal 100 in order to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a mobile terminal according to various embodiments to be explained later. The operation or the control method for the mobile terminal may be implemented on the mobile terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The terminal body may be understood as at least one assembly of the mobile terminal 100. The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may be provided with a display unit 151, first and second audio output modules 152a, 152b, a proximity sensor 141, an illumination sensor 142, an optical output module 154, first and second cameras 121a, 121b, first and second manipulation units 123a, 123b, a microphone 122, an interface 160, etc.

Hereinafter, as shown in FIGS. 1B and 1C, will be explained the mobile terminal 100 having the display unit 151, the first audio output module 152a, the proximity sensor 141, the illumination sensor 142, the optical output module 154, the first camera 121a and the first manipulation unit 123a on the front surface of the terminal body, having the second manipulation unit 123b, the microphone 122 and the interface unit 160 on the side surfaces of the terminal body, and having the second audio output module 152b and the second camera 121b on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the present invention, information processed in the mobile terminal may be displayed on a flexible display. This will be explained in more detail with reference to the attached drawings.

A display unit 220 is configured to be deformable by an external force. This deformation of the display unit 220 may include any of curving, bending, folding, twisting, rolling, and combinations thereof. The deformable display unit 220 may also be referred to as a 'flexible display unit'. Here, the flexible display unit 220 may include a general flexible display, and electronic paper. Generally, a mobile terminal 200 may include features the same as or similar to those of the mobile terminal 100 shown in FIGS. 1A to 1C.

The flexible display is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 220 is not deformed (for example, in a state with an infinite radius of curvature and referred to as a first state), a display region of the display unit 220 includes a generally flat surface. When the display unit 220 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 220 may be a curved state (for example, a state of being curved from up to down or from right to left), instead of being in flat state. In this embodiment, when an external force is applied to the flexible display unit 220, the flexible display unit 220 may transition to the second state such that the flexible display unit is deformed into the flat state (or a less curved state) or into a more curved state.

The flexible display unit 220 may form a flexible touch screen together with a touch sensor. When a touch input is applied to the flexible touch screen, the controller 180 (refer to FIG. 1A) may perform a control corresponding to the touch input. The flexible touch screen may sense a touch input not only in the first state, but also in the second state.

One option is to configure the mobile terminal 200 according to a modification embodiment of the present invention to include a deformation sensor which senses the deforming of the flexible display unit 220. The deformation sensor may be included in the sensing unit 140 (refer to FIG. 1A).

The deformation sensor may be located in the flexible display unit 220 or a case 201 to sense information related to the deforming of the flexible display unit 220. Examples of such information related to the deforming of the flexible display unit 220 may be a deformed direction, a deformed degree, a deformed position, a deformed amount of time, an acceleration that the flexible deformed display unit 220 is restored, and the like. Alternatively, such information may include various information sensible by bending of the flexible display unit 220.

In some embodiments, the controller 180 can change information displayed on the flexible display unit 220, or generate a control signal for controlling a function of the mobile terminal 200, based on the information related to the deforming of the flexible display unit 220.

The mobile terminal 200 according to the modification embodiment may further include a case for accommodating the flexible display unit 220 therein. The case may be configured to be transformable together with the flexible display unit 220 by an external force, taking into account characteristics of the flexible display unit 220.

A battery (not shown) located in the mobile terminal 200 may also be deformable in cooperation with the flexible display unit 220, taking into account the characteristic of the flexible display unit 220. One technique to implement such a battery is to use a stack and folding method of stacking battery cells.

A state change of the flexible display unit 220 is not limited to an external force. For instance, when the flexible display unit 220 is in a first state, the first state may be changed into a second state by a command of a user or an application.

Hereinafter, embodiments related to the mobile terminal will be explained in more detail with reference to additional drawing figures. It is understood by those skilled in the art that the present features can be embodied in several forms without departing from the characteristics thereof.

Figure 2:
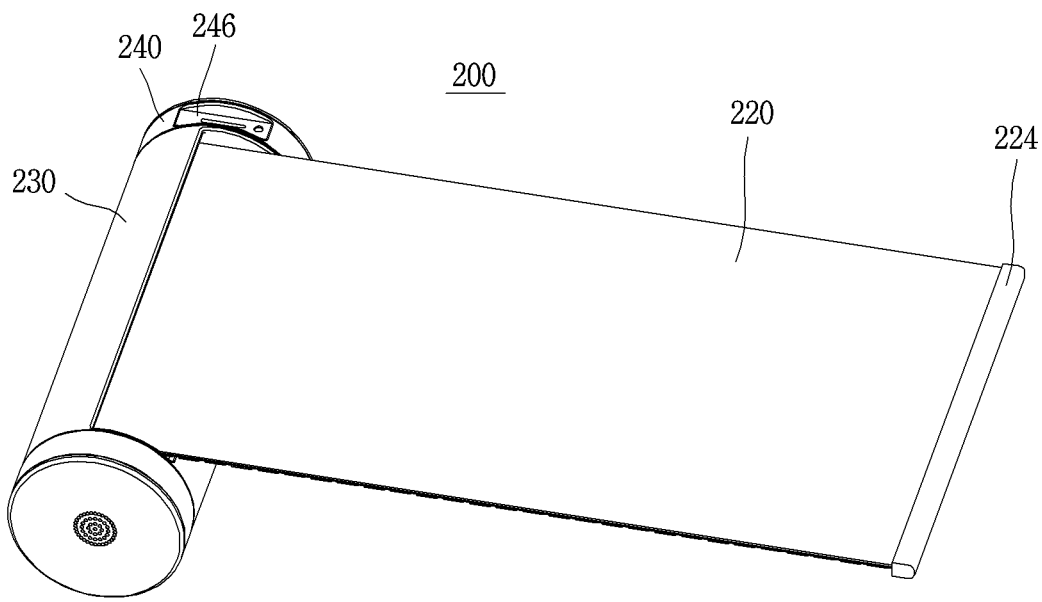
FIG. 2 is a perspective view of a mobile terminal according to an embodiment of the present invention.
Figure 3A:
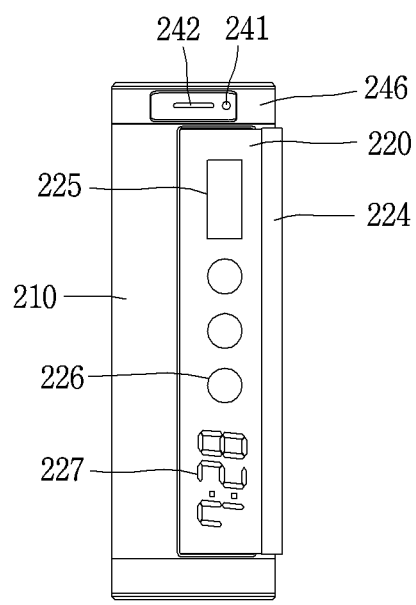
FIG. 3A illustrates a first state of a mobile terminal according to an embodiment of the present invention.
Figure 3B:
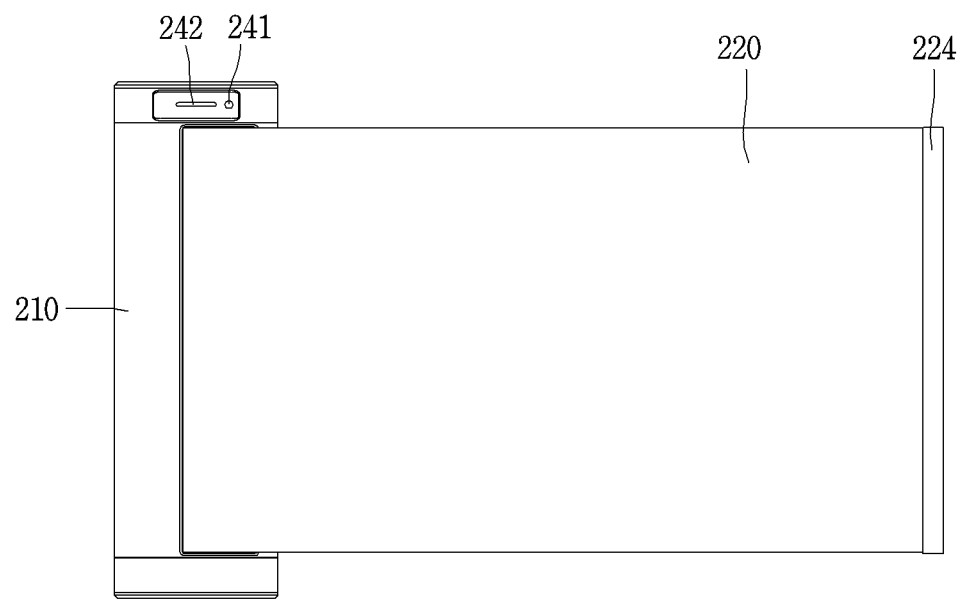
FIG. 3B illustrates a second state of a mobile terminal according to an embodiment of the present invention.

FIG. 2 is a perspective view of a mobile terminal 200 according to an embodiment of the present invention, FIG. 3A illustrates a first state of the mobile terminal 200 according to an embodiment of the present invention, and FIG. 3B illustrates a second state of the mobile terminal 200 according to an embodiment of the present invention.

According to an embodiment of the present invention, the mobile terminal 200 in which a user can easily adjust a display region displaying screen is provided, and the display region allows a region exposed to the outside to be enlarged or reduced by rolling. That is, the mobile terminal 200 according to an embodiment of the present invention includes a body part 210 into which various electronic elements are embedded and a display unit 220 which is accommodated into the body part 210 in a first state and is exposed to the outside of the body part 210 in a second state.

In an embodiment of the present invention, the first state of the mobile terminal 200 is a deactivated state of the mobile terminal 200 and denotes a state where a minimum portion of the display region is exposed to the outside in order for only a basic portion to be displayed. On the other hand, the second state of the mobile terminal 200 denotes a state where the display region is enlarged from the first state. In this case, the enlargement includes incremental enlargement. The display region of the mobile terminal 200 may be enlarged or reduced by rolling the display unit 220 and may be enlarged or reduced once, but the display region may be incrementally enlarged or reduced. Hereinafter, therefore, all states except the first state may be referred to as the second state, and the second state may be divided into a plurality of stages.

The body part 210 includes an intermediate case 230 which has a hollow type and includes a first magnetic member 233 provided therein and first and second cases 240 and 250 which are spaced apart from the intermediate case 230 and are respectively provided on and under the intermediate case 230. In this manner, the body part 210 is divided into three elements, and the first case 240, the intermediate case 230, and the second case 250 configure an external appearance of the mobile terminal 200. The intermediate case 230 is approximately cylindrical in shape, and the first case 240 and the second case 250 have a structure which covers the intermediate case in an upper portion and a lower portion. Various elements provided in the intermediate case 230 may be concealed by the first case 240 and the second case 250 without being exposed to the outside. In an embodiment of the present invention, the magnetic member may be a magnet.

Furthermore, as shown in FIG. 4, the first speaker 251 and the second speaker 252 may be respectively provided in the first case 240 and the second case 250, and speaker holes 251a and 252a are provided in the first and second speakers 251 and 252. In this manner, in an embodiment of the present invention, speakers may be provided on both sides of the intermediate case 230 to configure dual speaker. Also, an antenna 245 is provided in at least one of the first case 240 and the second case 250.

Figure 8:
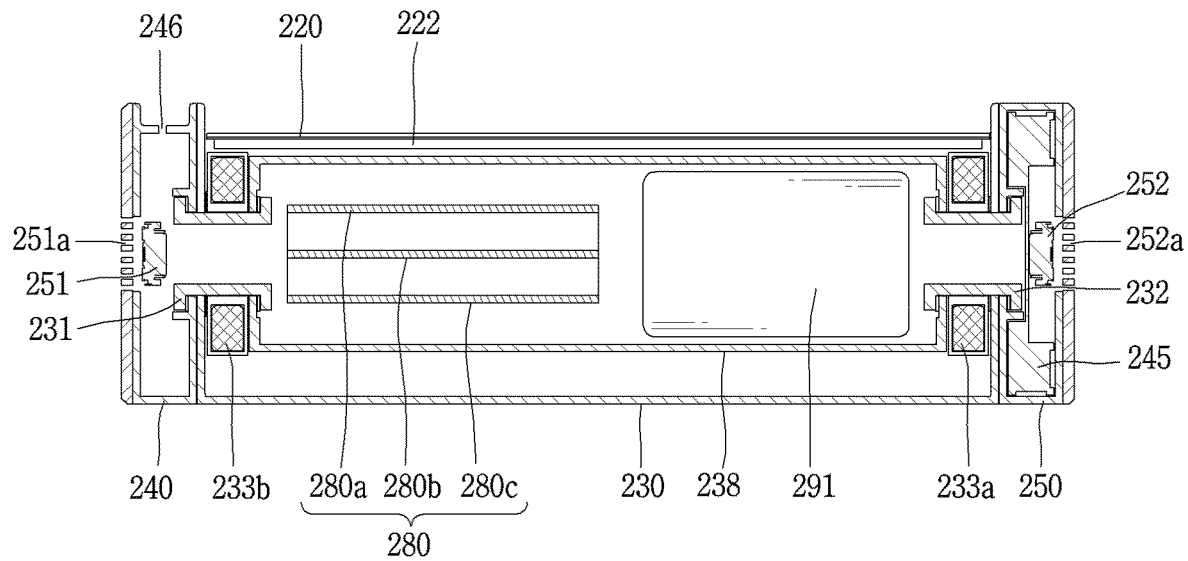
FIG. 8 is a cross-sectional view of a mobile terminal according to an embodiment of the present invention.

Moreover, in an embodiment of the present invention, a camera 241 and a sound output unit 242 may be installed in a portion of the first case 240 or the second case 250. That is, referring to FIGS. 3A and 3B, the camera 241 and the sound output unit 242 are provided in a portion of an outer surface of the first case 240 and always face the same direction even in the first state and the second state. As illustrated in FIGS. 3A and 8, it is illustrated that a recessed portion 246 which is recessed toward the inside of the first case 240 is provided in the first case 240 so that a planar surface instead of a curve surface is provided, and the camera 241 and the sound output unit 242 is provided in the recessed portion 246.

Moreover, in the first state, as illustrated in FIG. 3A, only a region such as a message window 225, an icon 226, or a time display part 227 may be displayed, thereby minimizing an exposed region of the display unit 220. However, in the second state, as illustrated in FIG. 3B, the exposed region of the display unit 220 may be maximized, and thus, a screen may be displayed on a larger region. The message window 225, the icon 226, and the time display part 227 are displayed in a basic state of the display unit 220.

Figure 5A:
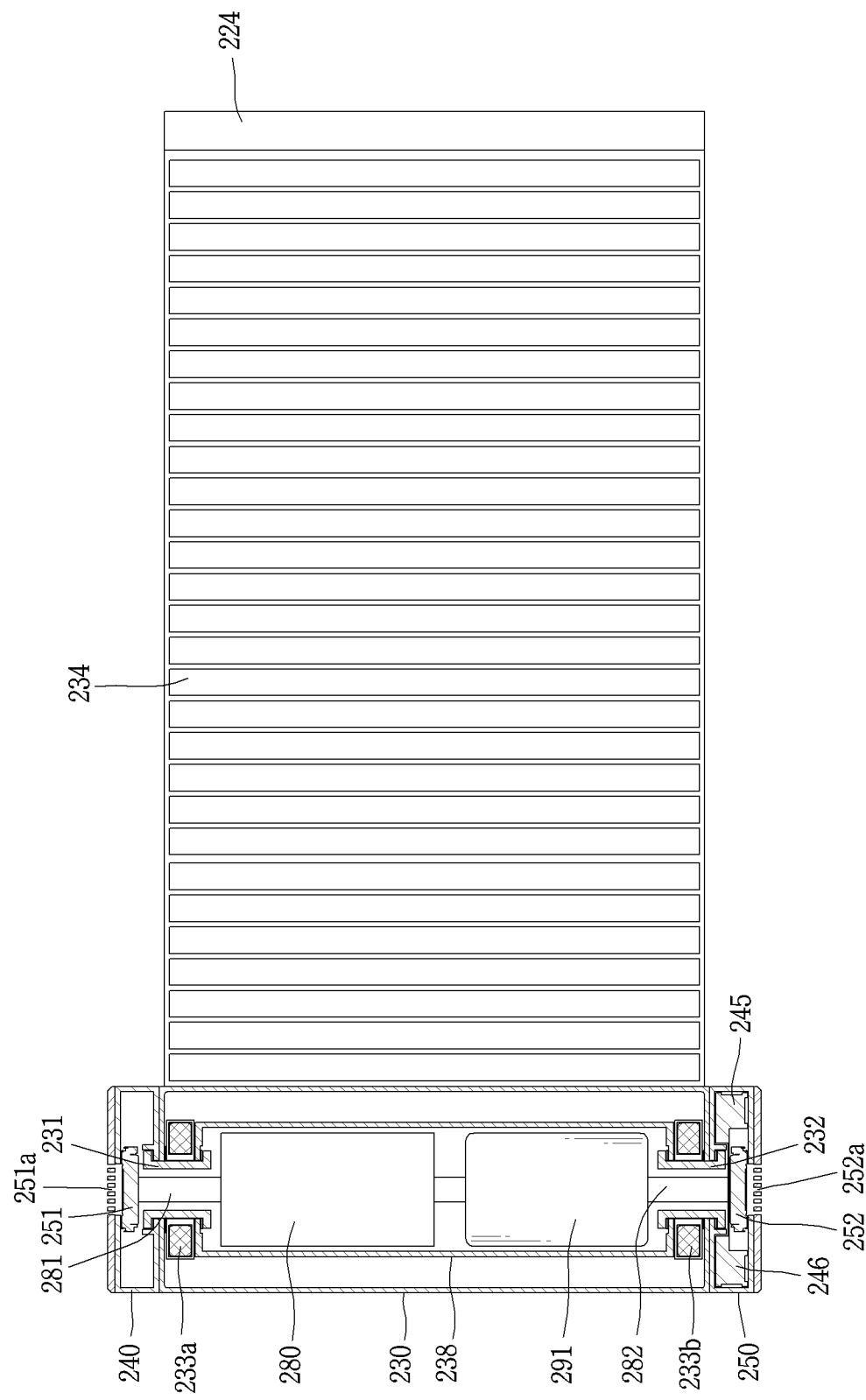
FIG. 5A is a rear view when a mobile terminal according to a first embodiment of the present invention is seen from a rear surface.
Figure 5B:
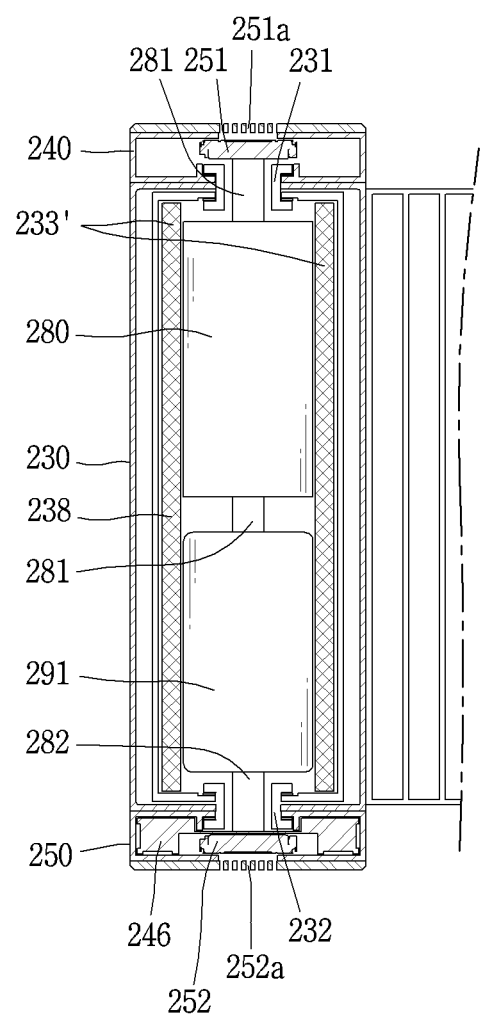
FIG. 5B is a cross-sectional view of a mobile terminal according to a second embodiment of the present invention.
Figure 5C:
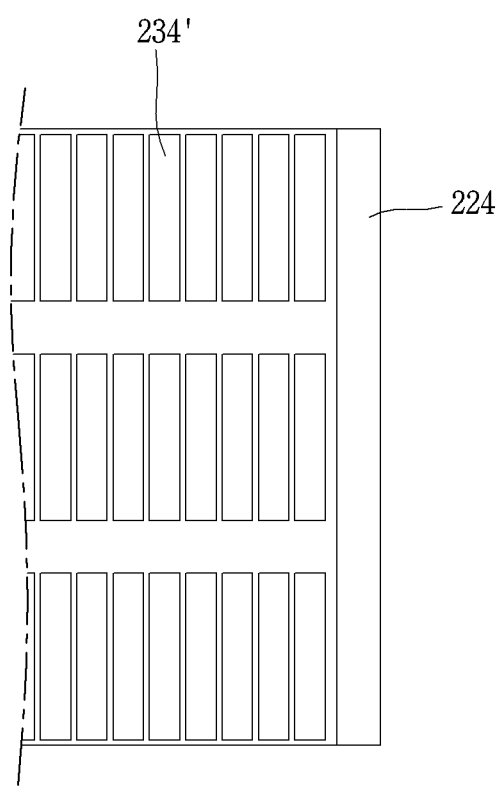
FIG. 5C is a partial rear view of a display unit of a mobile terminal according to a third embodiment of the present invention.
Figure 9:
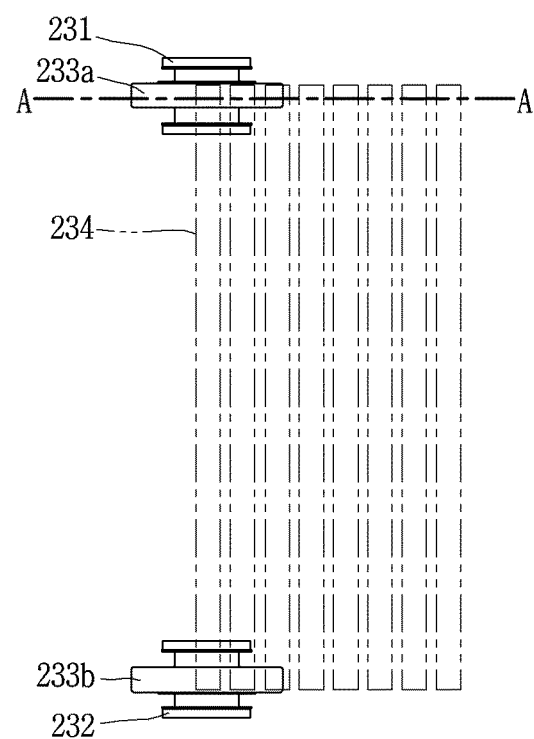
FIG. 9 is a diagram for describing disposition of a first magnetic member and a second magnetic member according to an embodiment of the present invention.
Figure 10:
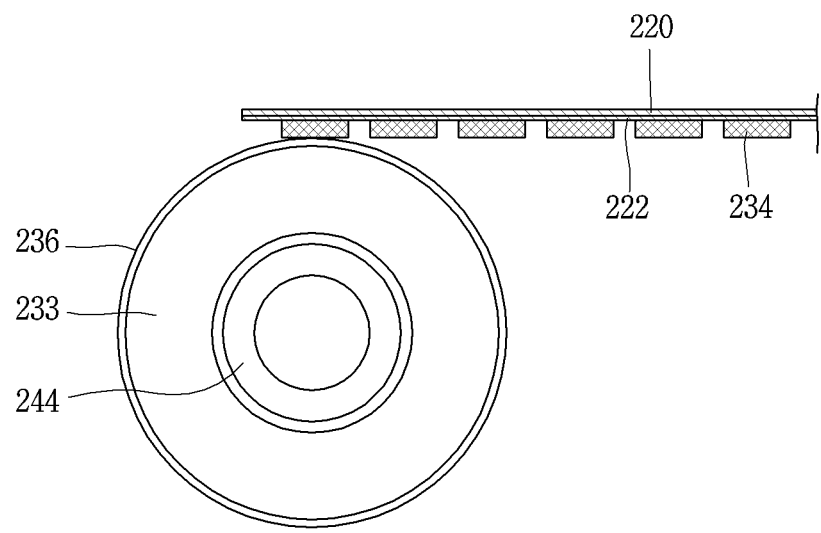
FIG. 10 is a cross-sectional view taken along AA of FIG. 9.

FIG. 4 is an exploded perspective view of the mobile terminal 200 according to an embodiment of the present invention, FIG. 5A is a rear view when a mobile terminal 200 according to a first embodiment of the present invention is seen from a rear surface, FIG. 5B is a cross-sectional view of a mobile terminal 200 according to a second embodiment of the present invention, FIG. 5C is a partial rear view of a display unit 220 of a mobile terminal 200 according to a third embodiment of the present invention. FIG. 9 is a diagram for describing disposition of first magnetic members 233a and 333b and a second magnetic member 234 according to an embodiment of the present invention, and FIG. 10 is a cross-sectional view taken along AA of FIG. 9.

Hereinafter, an embodiment of the present invention will be described with reference to FIGS. 4 to 5C, 9, and 10.

First, in an embodiment of the present invention, the display unit 220 is rolled by adjusting a region of the display unit 220 exposed to the outside and is wound (rolled or coiled) or unwound (unrolled or uncoiled) on the intermediate case 230. That is, the intermediate case 230 performs a function of a bobbin. To this end, in an embodiment of the present invention, a magnetic force is used. In more detail, a cylindrical-shaped internal case 238 is provided in the intermediate case 230, and the display unit 220 is rolled on the internal case 238 and rotates along with the internal case 238.

A plurality of second magnetic members 234 which are provided along a first direction and are separated from each other are provided under the display unit 220 and are sequentially moved by an attractive force with the first magnetic member 233, whereby the display unit 220 is rolled. For example, if the first magnetic members 233a and 233b have N pole and the second magnetic member 234 has S pole, the first and second magnetic members 233a, 233b, and 234 are attracted by a magnetic force.

That is, since the first magnetic members 233a and 233b are fixed, the second magnetic member 234 perform a rectilinear motion toward the first magnetic members 233a and 233b and are attracted, and second magnetic members 234 which are continuously provided and are separated from each other are continuously loaded into the intermediate case 230. The loaded second magnetic members 234 continuously generate an attractive force with the first magnetic member 233, and thus, the attractive force is balanced with an attractive force between a newly loaded second magnetic member 234 and the first magnetic member 233, whereby the second magnetic members 234 rotate about the first magnetic member 233. Due to such a mechanism, the display unit 220 is rolled and wound in the intermediate frame.

As described above, in the first embodiment of the present invention, the first magnetic members 233a and 233b which are respectively coupled to first and second shafts 231 and 232 to perform a rotational motion have the same polarity, and are disposed to have polarity different from that of the second magnetic member 234. In this case, a force where the first and second magnetic members 233a, 233b, and 234 are attracted by an attractive force is converted into a rotational motion. That is, first, the second magnetic member 234 loaded into the intermediate case 230 is provided on an outer circumference surface of the internal case 238, and the second magnetic member 234 which is to be newly loaded in are attracted to the internal case 238 by an attractive force with the first magnetic members 233a and 233b, whereby the first-loaded second magnetic member 234 rotates. Subsequently, the internal case 238 rotates autonomously and continuously, and thus, the second magnetic member 234 is loaded in.

Figure 7:
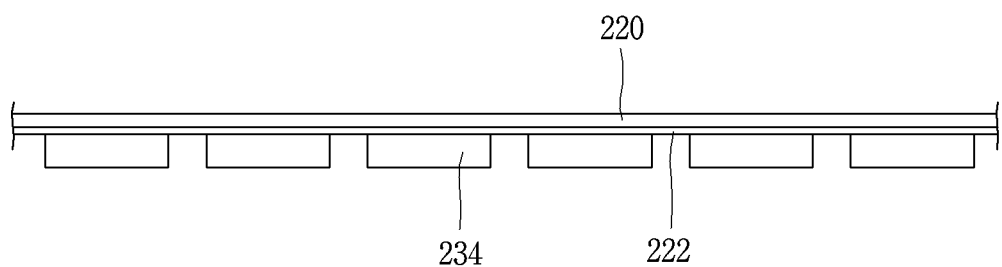
FIG. 7 is a cross-sectional view of a display unit according to an embodiment of the present invention.

FIG. 7 is a cross-sectional view of the display unit 220 according to an embodiment of the present invention. Referring to FIG. 7, a sheet 222 where the plurality of second magnetic members 234 are provided is provided on a bottom of the display unit 220, and the sheet 222 should be a flexible material, for example, the sheet 222 may be silicon or thermoplastic poly urethane (TPU). The sheet 222 may be adhered to a rear surface of the display unit 220 in a sheet frame type, the sheet 222 may sequentially fix the second magnetic members 234, and may be provided through bonding, tape, or insert molding.

Also, the sheet 222 should have a thin thickness and flexible properties and should use a material which is good in elasticity and elongation. This is for that the plurality of second magnetic members 234 have the same magnetic pole, and thus, the display unit 220 is flatly unfolded by repulsion. That is, repulsion are applied to the second magnetic members 234 having the same magnetic pole to extrude the second magnetic members 234 which are provided adjacent to each other, and thus, in the second state, the display unit 220 is flatly unfolded.

Referring to FIG. 5A, the mobile terminal 200 further includes a first shaft 231 provided between the first case 240 and the intermediate case 230 and a second shaft 232 provided between the second case 250 and the intermediate case 230. The first shaft 231 and the second shaft 232 have a cylindrical shape where both ends are open, the first shaft 231 may be fixed to the first case 240 or the internal case 238, and the second shaft 232 may be fixed to the second case 250 or the internal case 238. For example, when the first shaft 231 is fixed to the first case 240 and the second shaft 232 is fixed to the second case 250, the internal case 238 rotates independently from the first case 240 and the second case 250. In this manner, the internal case 238 performs a function of mandrel in order for the display unit 220 to be wound.

To this end, the first shaft 231 and the second shaft 232 are fixed at only one end, or should not be fixed at both ends. For example, if the first shaft 231 is fixed to the first case 240 and the internal case 238, a rotational force of the internal case 238 is transferred to the first case 240, and thus, the internal case 238 rotates along with the first case 240. Likewise, if the second shaft 232 is fixed to the second case 250 and the internal case 238, the rotational force of the internal case 238 is transferred to the second case 250, and thus, the internal case 238 rotates along with the second case 250. In order to prevent this, only one end of each of the first and second shafts 231 and 232 is fixed, and the other end should be a free end. Also, if both ends of each of the first and second shafts 231 and 232 are not fixed to any one of the first and second cases 240 and 250 and the internal case 238, the internal case 238 rotates independently from the first and second cases 240 and 250.

Figure 6:
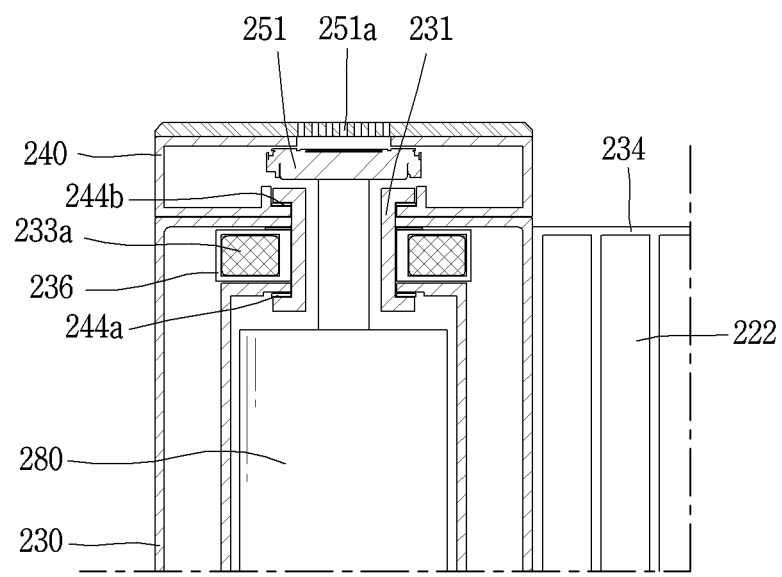
FIG. 6 is a partial cross-sectional view of a mobile terminal according to an embodiment of the present invention.

The first and second shafts 231 and 232 act as a free end or a fixed end due to washers 244a and 244b which are provided on one sides or both sides of the first and second shafts 231 and 232. The washers 244a and 244b are provided in a donut shape and may adjust a degree of transferring a frictional force between two elements contacting each other. In an embodiment of the present invention, as illustrated in FIG. 6, the washers 244a and 244b are provided in both ends of the second shaft 252 which connects the second case 250 to the intermediate case 230. In more detail, a first washer 244a is provided between the internal case 238 and the second shaft 232, and a second washer 244b is provided between the second case 250 and the second shaft 232. By reducing a frictional force of one of the first and second washers 244a and 244b, a rotational force of the internal case 238 is not transferred to the second case 250 by the second shaft 232.

For example, if a frictional force of the first washer 244a increases and a frictional force of the second washer 244b decreases, a rotational force of the internal case 238 is transferred to the second shaft 232, and thus, the second shaft 232 rotates along with the internal case 238. At this time, a rotational force of the second shaft 232 is not transferred to the second case 250, and thus, the internal case 238 rotates independently from the second case 250. This is identically applied to a relationship between the first shaft 231 and the first case 240, and thus, its detailed description is omitted.

According to the first embodiment of the present invention, as illustrated in FIG. 5A, the first magnetic member 233 is provided on an outer circumference surface of each of the first and second shafts 231 and 232. That is, the first and second shafts 231 and 232 are approximate H in shape, and the first magnetic members 233a and 233b are provided to surround middle portions of the first and second shafts 231 and 232. That is, the first magnetic members 233a and 233b are disposed on the outer circumference surfaces of the first and second shafts 231 and 232 along a second direction vertical to the first direction and are spaced apart from each other.

The first magnetic members 233a and 233b are provided in pairs and are respectively provided on both ends of the internal case 238. In FIG. 5A, it is illustrated that the first magnetic members 233a and 233b are disposed on the both ends of the internal case 238, but depending on the case, the first magnetic member 233 may be provided in a middle portion of the internal case 238 without being limited thereto. In this case, the pair of first magnetic members 233a and 233b have a donut shape, and magnetic poles of portions deviating from center axes of the first and second shafts 231 and 234 are the same and are opposite to a magnetic pole in an exposed portion of the second magnetic member 234. In other words, the first magnetic members 233a and 233b are disposed in order for an attractive force to react between the first magnetic member 233 and the second magnetic member 234.

Furthermore, in the second embodiment of the present invention, as illustrated in FIG. 5B, a first magnetic member 233' may be provided in a cylindrical shape and may be long provided along the second direction. In this case, in an embodiment of the present invention, the first direction is a direction in which the display unit 220 is inserted into the intermediate case 230 or is unloaded from the intermediate case 230 and denotes a moving direction of the display unit 220, and the second direction is vertical to the first direction and denotes an axial direction in which the first case 240 is connected to the second case 250. In this case, a line connecting the first shaft 231 to the second shaft 232 corresponds to a center axis of the body part 210 and corresponds to a rotational shaft of the internal case 238.

Except for a shape of the first magnetic member 233, the second embodiment of the present invention is the same as the first embodiment, and thus, unless specially limited, has the same structure as the first embodiment. Hereinafter, therefore, a description of the mobile terminal 200 according to the embodiment of the present invention is omitted. The first magnetic member 233' may be provided on an inner circumference surface or an outer circumference surface of the internal case 238. In FIG. 5B, the first magnetic member 233' is illustrated as being provided on the inner circumference surface of the internal case 238. Even in the second embodiment, when the display unit 220 is wound, the first magnetic member 233' rotates along with the internal case 238.

Moreover, the third embodiment of the present invention relates to a case where a second magnetic member 234' provided under the display unit 220 is divided into a plurality of magnetic members which are provided along the first direction and have the same polarity. In the first and second embodiments, the second magnetic member 234 adhered to the display unit 220 is long provided along the second direction to have a length corresponding to the internal case 238, but in the third embodiment, two or more second magnetic members 234' are divisionally provided. In this manner, the second magnetic member 234 are divided into a more number of second magnetic members 234', and thus, the number of consumed magnetic members is reduced. In the third embodiment, the other part is the same as the above-described first embodiment, and thus, its detailed description is omitted.

A circuit board 280 and a battery 291 are provided in the intermediate case 230 according to an embodiment of the present invention, and a plurality of elements are embedded into the first case 240 and the second case 250. The plurality of elements are connected to the circuit board 280 and are electrically connected to each other by first and second flexible circuit boards 281 and 282 which are provided along the inside of the first and second shafts 231 and 232. In this manner, in order to dispose the first and second flexible circuit boards, the first and second shafts 231 and 232 are hollow, and the first and second flexible circuit boards are disposed through internal spaces of the first and second shafts 231 and 233.

The intermediate case 230 has a cylindrical shape, and both ends (bottoms) have a circular shape where a hole is provided in a center, in order for elements provided inside the intermediate case 230 not to deviate to the outside. This is similar to the internal case 238. Also, a first cut groove 230 which is formed by cutting a portion of the intermediate case 230 along the second direction is provided in the intermediate case 230 in order for the display unit 220 to be wound and unwound, and similarly, a second cut groove 238a is provided in the internal case 238 along the second direction in order for a third flexible circuit board 283 electrically connecting the display unit 220 to the circuit board 280 to be inserted into the second cut groove 238a. The internal case 238 is disposed to have a concentric circle with the intermediate case 230. In this case, the first cut groove 230a is provided in a whole section of the intermediate case 230 along the second direction, and the second cut groove 238a is provided in a partial section of the internal case 238 along the second direction. To this end, since the display unit 220 is inserted into or unloaded from the first cut groove 230a, a length of the first cut groove 230a in the second direction should be equal to or greater than a width of the display unit 220. However, the second cut groove 238a is a portion into which the third flexible circuit board 283 less in width than the display unit 220 is inserted, and thus, should be equal to or greater than a width of the third circuit board 283.

Figure 13A:
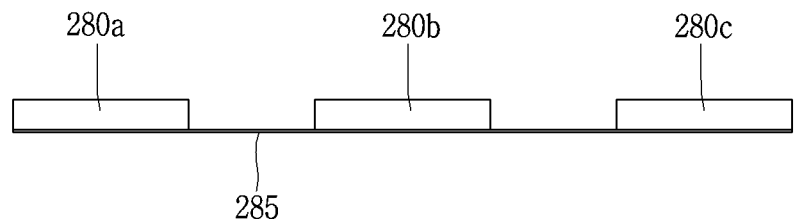
FIG. 13A illustrates a state where a circuit board according to an embodiment of the present invention is unfolded.
Figure 13B:
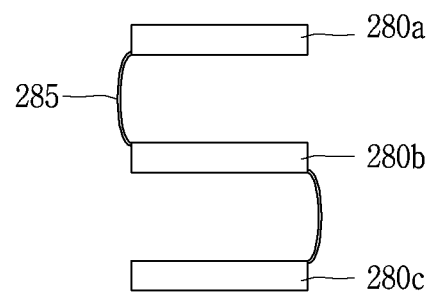
FIGS. 13B and 13C illustrate a connection state in a case where the circuit board of FIG. 13A is stacked.
Figure 13C:
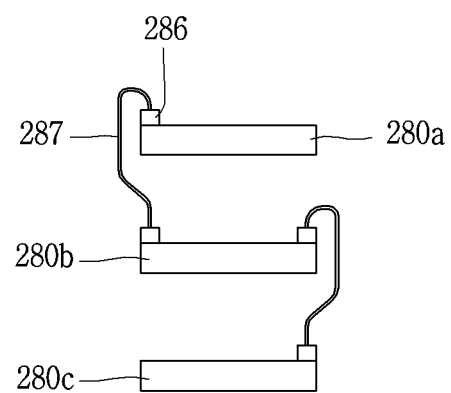

FIG. 8 is a cross-sectional view of a mobile terminal according to an embodiment of the present invention and illustrates an example where a circuit board 280 provided in the internal case 238 is provided to have three layers. In this context, FIG. 13A illustrates a state where the circuit board 280 according to an embodiment of the present invention is unfolded, and FIGS. 13B and 13C illustrate a connection state in a case where the circuit board 280 of FIG. 13A is stacked. Referring to FIGS. 13A and 13B, first to third boards 280a, 280b, and 280c having a rigid plate shape are provided, the first to third boards 280a, 280b, and 280c are electrically connected to each other by a flexible connection part 285, and the connection part 285 may be, for example, a cable or a flexible circuit board. The first to third boards 280a, 280b, and 280c are general circuit boards and are rigid parts, and in order to dispose the first to third boards 280a, 280b, and 280c in a narrow space, the first to third boards 280a, 280b, and 280c are divided into a plurality of regions, and the divided plurality of regions are electrically connected to one another.

As described above, in an embodiment of the present invention, at least two boards are provided, and the boards are electrically connected to each other by the flexible connection part, whereby the circuit board 280 may be disposed in an internal narrow space of the internal case 238. In this case, connection parts connecting the first to third boards 280a, 280b, and 280c are disposed at opposite positions, and the first to third boards 280a, 280b, and 280c are stacked, thereby preventing twisting or interference of the connection parts 285 and 287.

Moreover, as illustrated in FIG. 13C, a connector 286 is provided on one surface of each of the first to third boards 280a, 280b, and 280c, and the connector 286 is connected to the first to third boards 280a, 280b, and 280c by the connection part 287, whereby the first to third boards 280a, 280b, and 280c are electrically connected to one another. The connection part 287 may be the same as the above-described connection part 285, but may be a simple cable connected to the connector 286. If the connection part 287 is an electrical element connecting two points, the connection part 287 is not limited.

The circuit board 280 formed by the above-described manner is supported by a supporting frame 262 and is provided inside the internal case 238. (see FIG. 12C) That is, the supporting frame 262 including a space where the first to third boards 280a, 280b, and 280c are positioned is fixed to the inside of the internal case 238 to allow the circuit board 280 to be disposed.

Moreover, as illustrated in FIG. 6, a hold case 236 is provided on an outer circumference of the first magnetic member 233a. The hold case 236 is a member accommodating the first magnetic member 233 and has a circular shape, and in more detail, fixes the first magnetic member 233a having a donut shape so as not to move and fixes the first shaft 231. That is, the hold case 236 is provided between the intermediate case 230 and the internal case 238 to prevent the first shaft 231 from moving upward and downward. This is similar to the second shaft 232. In this case, the hold case 236 uses a material, which is small in friction, such as poly oxy methylene (POM) so as to reduce a rotational friction.

In the mobile terminal 200 according to an embodiment of the present invention, a user pulls the display unit 220 to expose the display unit 220 to the outside, and the second state should be maintained in a state where an external force applied by the user is removed. For example, if an end of the display unit 220 should be continuously fixed for maintaining the second state by the user pulling the display unit 220, inconvenience occurs in use. In order to solve such a problem, in an embodiment of the present invention, a structure illustrated in FIG. 11 is proposed.

Figure 11:
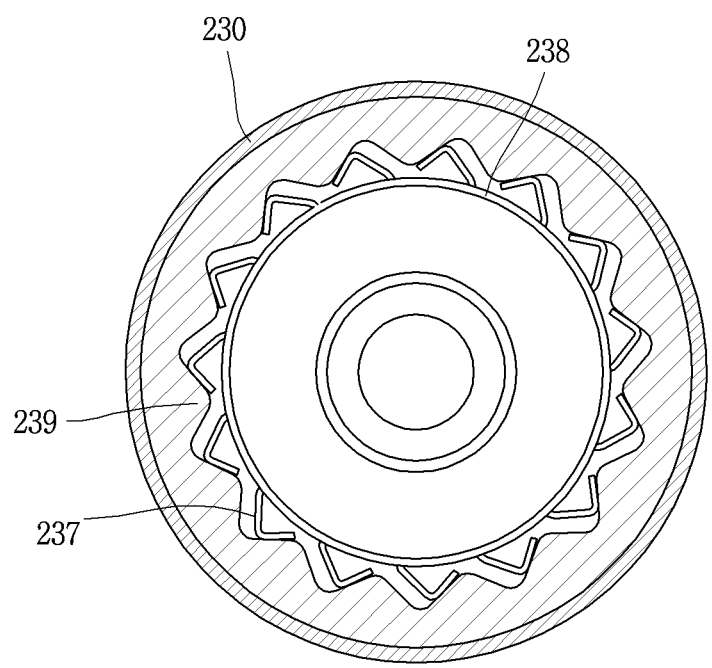
FIG. 11 is a diagram for describing a fastening relationship between an internal case and an intermediate case according to an embodiment of the present invention.

FIG. 11 is a diagram for describing a fastening relationship between an internal case 238 and an intermediate case 230 according to an embodiment of the present invention. A plurality of first projections 237 are provided on an outer circumference surface of the internal case 238 in a circumference direction, and a second projection 239 where a corresponding position is sequentially changed according to a rotation of the internal case 238 in correspondence with the first projection 237 is provided on an inner circumference surface of the intermediate case 230. The first projection 237 is provided from an outer circumference surface of the internal case 238, and an end of the first projection 237 is not fixed to the internal case 238 and has a bent shape. This is for providing elasticity because the first projection 271 should move in contact with the second projection 239. That is, if the first projection 237 stops in a state of contacting the second projection 239, the end of the first projection 237 is spaced apart from an outer circumference surface of the internal case 238, but since the second projections 239 pushes the first projections 237 in a process where the first projections 237 change positions contacting the second projections 239, the ends of the first projections 237 should contact the outer circumference surface of the internal case 238 or should be spaced apart from the outer circumference surface of the internal case 238 up to an almost contact state. To this end, in an embodiment of the present invention, the first projections 237 are provided in a hook shape to have an elastic force. It is not required that the first and second projections 237 and 239 are provided all over the internal case 238 and the intermediate case 230 along the second direction, and the first and second projections 237 and 239 may be provided in only a portion of each of the internal case 238 and the intermediate case 230. To this end, a length of each of the internal case 238 and the intermediate case 230 should be set longer than a width of the display unit 220. This is because the display unit 220 is wound on the outer circumference surface of the internal case 238, and thus, a space where the display unit 220 is not wound is needed.

In this case, the first projection 237 and the second projection 239 are coupled to each other through concave-convex coupling or gear coupling in a state where the internal case 238 stops without rotating. The concave-convex coupling or the gear coupling is not strong coupling which is released by an external force, and when a force having a certain level or more is applied from the outside, the concave-convex coupling or the gear coupling is made at a new position by a rotation of the internal case 238.

For example, in a case where the user desires to pull the display unit 220 having the first state to change the first state to the second state, the user may pull the display unit 220 by a desired movement distance. In this case, the display unit 220 is fixed to the second projection 239 of the intermediate case 230, and thus, once the first and second projections 237 and 239 are coupled to each other, the second state is maintained by maintaining a state where an external force is removed, despite the external force being removed. To provide description in more detail, in a case where the user pulls the display unit 220 at a fast speed, the first and second projections 237 and 239 move without being caught, but in a case of pulling the display unit 220 at a slow speed, the first and second projections 237 and 239 move incrementally. In this manner, if the user slowly pulls the display unit 220, the first and second projections 237 and 239 repeat that a coupling state is maintained, and then, movement is made by release of the coupling, and then, the coupling state is again maintained. Once a coupling state is made, the coupling state is maintained without being released unless an external force is applied from the outside.

Therefore, in an embodiment of the present invention, a size of a region of the display unit 20 can be incrementally adjusted.

Figure 12A:
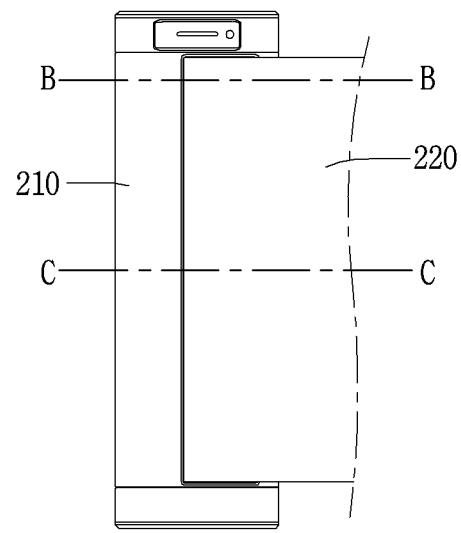
FIG. 12A is a partial plan view in a second state of a mobile terminal according to an embodiment of the present invention.
Figure 12B:
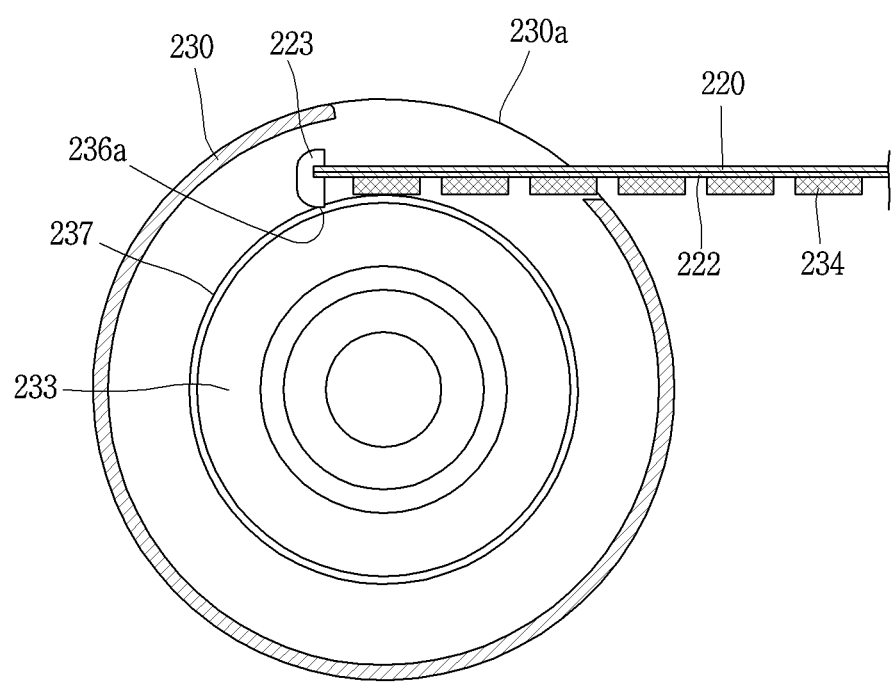
FIG. 12B is a cross-sectional view taken along BB of FIG. 12A.
Figure 12C:
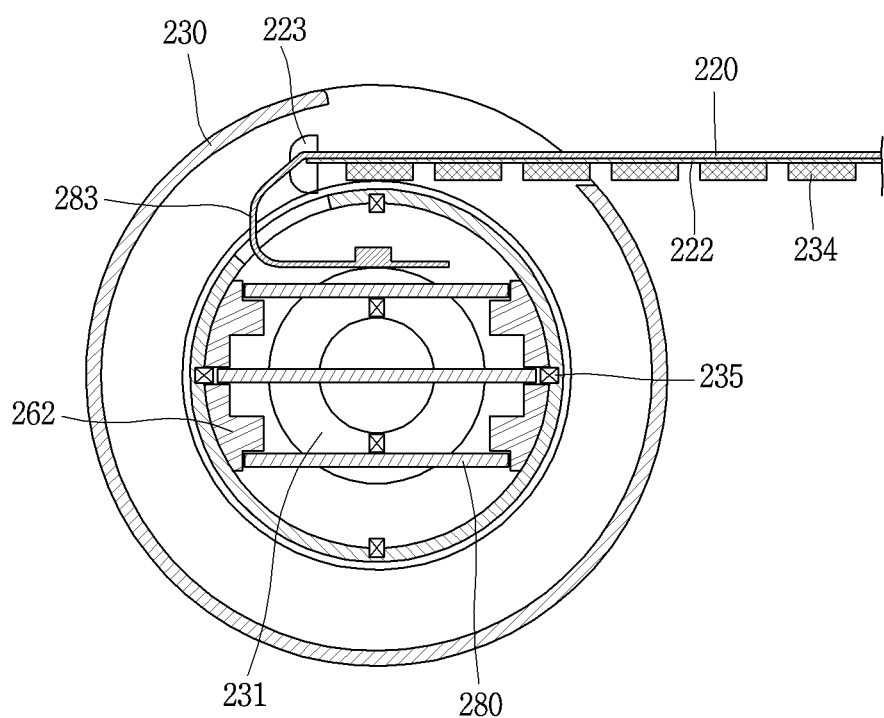
FIG. 12C is a cross-sectional view taken along CC of FIG. 12A.

FIG. 12A is a partial plan view in a second state of a mobile terminal 200 according to an embodiment of the present invention, FIG. 12B is a cross-sectional view taken along BB of FIG. 12A, and FIG. 12C is a cross-sectional view taken along CC of FIG. 12A.

Referring to FIG. 12B, it can be seen that a first holder 223 is provided in an inner end of the display unit 220 along the second direction, and thus, in the second state, the first holder 223 is hanged on a groove 236a provided in the outer circumference surface of the internal case 238. In this manner, since the end of the display unit 220 is fixed to the internal case 238, even when a user forcibly pulls the display unit 220, the display unit 220 does not deviate from the internal case 238.

Similarly, a second holder 224 is long provided in an outer end of the display unit 220 along the second direction, and thus, the display unit 220 is not rolled into the inside of the intermediate case 230. That is, as illustrated in FIGS. 3A and 4, the second holder 224 is hanged on the cut groove 230a of the intermediate case 230, and thus, is not loaded into the intermediate case 230.

FIG. 12B is a diagram for describing an example where the display unit 220 is wound by an attractive force between the second magnetic members 234 provided under the display unit 220 according to an embodiment of the present invention and the first magnetic member 233 provided in the intermediate case 230. In this case, a magnetic pole of an exposed portion of the second magnetic member 234 and a magnetic pole of an outer surface portion of the first magnetic member 233 have different polarities. This can be understood through the above description of a process of winding the display unit 220, and thus, its detailed description is omitted.

FIG. 12C illustrates an example where the display unit 220 is connected to the internal case 238 by the third flexible circuit board 283 and is connected to the circuit board 280 provided in the internal case 238. In this case, as described above, the circuit board 280 may be configured with three layers, and the circuit board 280 is provided in the supporting frame 262. To this end, as illustrated in FIG. 4, the second cut groove 238*a* into which the third flexible circuit board 283 is capable of being inserted is provided in the internal case 238.

Moreover, in FIG. 12C, a plurality of hall sensor 235 (a hall IC) are provided on an inner circumference surface of the internal case 238 and in the internal case 238. The hall sensor 235 senses a magnetic force of the first magnetic member 233 to enable calculation of a length by which the display unit 220 is wound. This will be described below with reference to FIGS. 14A and 14B.

Figure 14A:
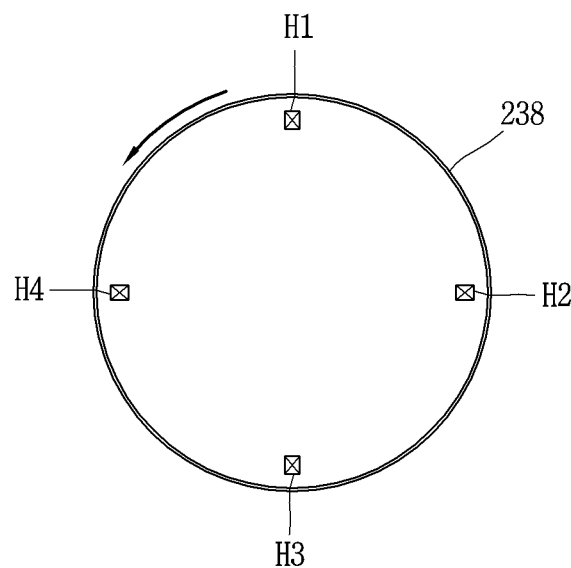
FIGS. 14A and 14B are diagrams separately illustrating only a hall sensor illustrated in FIG. 12C.
Figure 14B:
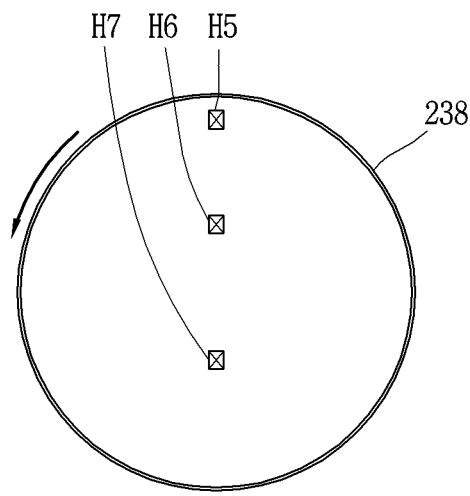

FIGS. 14A and 14B are diagrams separately illustrating only the hall sensor 235 illustrated in FIG. 12C. First, referring to FIG. 14A, four hall sensors 235 (i.e., first to fourth hall sensors H1, H2, H3, and H4) are arranged at certain intervals along a circumference direction of the internal case 238 on the inner circumference surface or in an internal space of the internal case 238 and are spaced apart from one another. In this case, the first to fourth hall sensors H1, H2, H3, and H4 sense a variation of a magnetic force of the second magnetic member 234 in the circumference direction of the internal case 238 to sense a movement of the second magnetic member 234.

In FIGS. 14A and 14B, an arrow denotes a rotational direction of the internal case 238. As the internal case 238 rotates, the first to fourth hall sensors H1, H2, H3, and H4 rotates along with the internal case 238, and in the second state where the display unit 220 is maximally exposed, only the first hall sensor H1 senses the second magnetic member 234. Subsequently, when the internal case 238 rotates counterclockwise, the display unit 220 is wound on the internal case 238, and the second hall sensor H2, the third hall sensor H3, and the fourth hall sensor H4 sequentially sense the second magnetic member 234. In this manner, the first to fourth hall sensors H1, H2, H3, and H4 provide information which enables measurement of a length of the display unit 220 wound on the outer circumference surface of the internal case 238. Therefore, in a case where the display unit 220 is wound or unwound, if a sensor which has finally sensed the second magnetic member 234 is known, the number of winding or unwinding of the display unit 220 may be calculated. This is similar to a case where the display unit 220 is wound on the internal case 238 a plurality of times. However, in a case where the display unit 220 is wound on the outer circumference surface of the internal case 238 as two or more layers, a variation of a magnetic force in a radius direction of the internal case 238 occurs, and thus, if a hall sensor 235 which senses the variation of the magnetic force is provided, a length by which the display unit 220 is wound may be measured.

For example, as illustrated in FIG. 14B, if two or more hall sensors 235 are arranged at certain intervals in the radius direction of the internal case 238 and are spaced apart from each other, the two or more hall sensors 235 may sense a variation of a magnetic force of the second magnetic member 234 which are stacked on the outer circumference surface of the internal case 238 twice or more, a length by which the display unit 220 is wound may be more accurately calculated. In FIG. 14B, it is illustrated that three sensors (fifth to seventh hall sensors H5, H6, and H7) are disposed, but the present embodiment is not limited thereto. In other embodiments, two or more hall sensors 235 may be provided along the radius direction of the internal case 238 to sense the variation of the magnetic force of the second magnetic member 234 which are stacked on the outer circumference surface of the internal case 238. That is, the fifth to seventh hall sensors H5, H6, and H7 sense a variation of a magnetic force of the second magnetic member 234 in the radius direction of the internal case 238.

To provide description in more detail, in a state of FIG. 12C, the first to fourth hall sensors H1, H2, H3, and H4 may calculate a wound length while the display unit 220 is wound on the internal case 238 as one layer, and when the display unit 220 is wound in a state of being stacked on the internal case 238 as two layers, the fifth to seventh hall sensors H5, H6, and H7 sense a variation of a magnetic force in the radius direction. Subsequently, the first to fourth hall sensors H1, H2, H3, and H4 may calculate a wound length, and when the display unit 220 is stacked as three layers in a radius direction in which the fifth to seventh hall sensors H5, H6, and H7 are provided, the fifth to seventh hall sensors H5, H6, and H7 sense a variation of a magnetic force. In this manner, a length of display unit 220 wound on the outer circumference surface of the internal case 238 may be calculated by the first to fourth hall sensors H1, H2, H3, and H4, and when the display unit 220 is stacked on the outer circumference surface of the internal case 238 as a plurality of layers and are wound, a length of display unit 220 may be calculated by the first to fourth hall sensors H1, H2, H3, and H4. However, magnetic force variation sensing information obtained by the fifth to seventh hall sensors H5, H6, and H7 may be referenced for more accurate measurement. In this case, the first hall sensor H1 and the fifth hall sensor H5 may be the same hall sensors 235.

In an embodiment of the present invention, by calculating a length by which the display unit 220 is wound, a ratio of a screen which is to be displayed on the display unit 220 may be calculated, and thus, the ratio of the screen may be adjusted so as to be suitable for a region size of the display unit 220 which is wound and exposed to the outside.

Figure 15A:
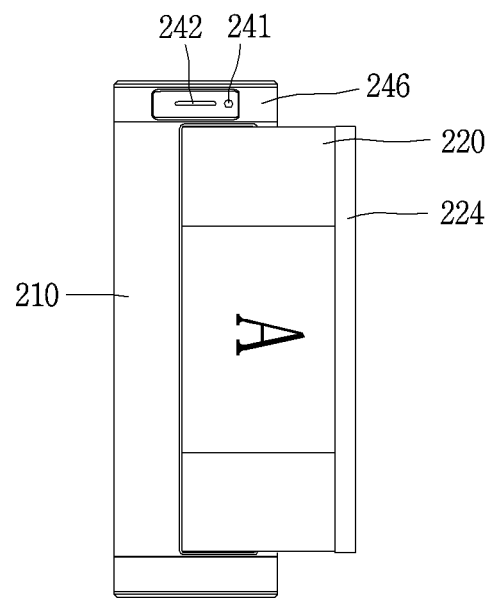
FIGS. 15A to 15C are diagrams for describing a change in screen ratio based on an exposed region of a display unit according to an embodiment of the present invention.
Figure 15B:
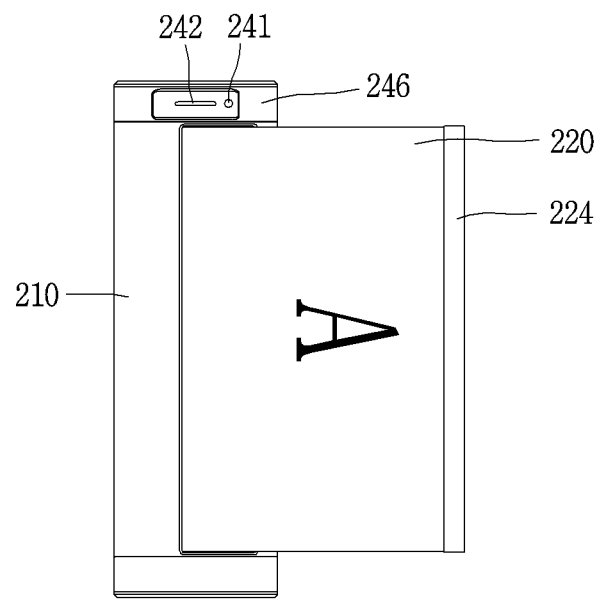
Figure 15C:
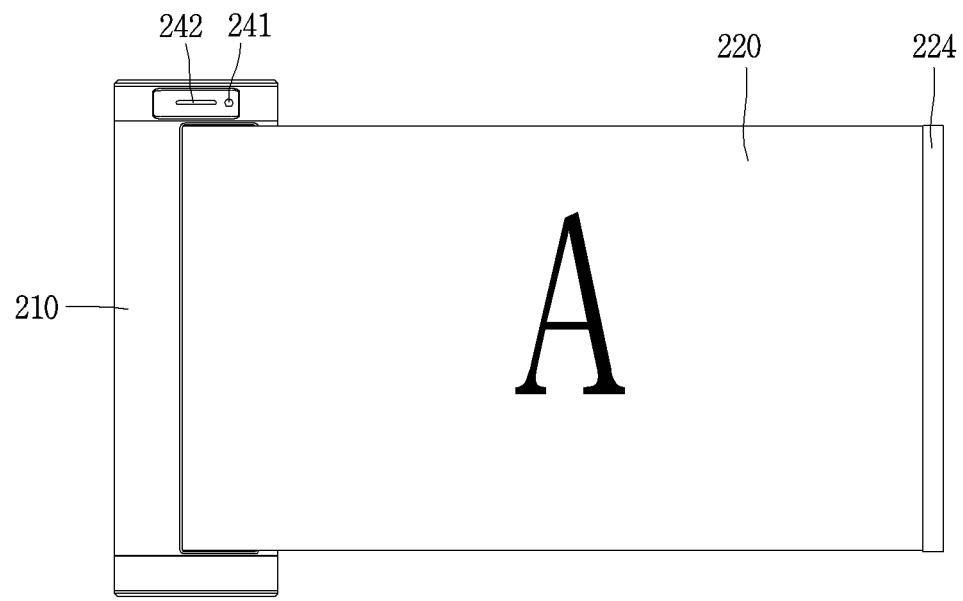

FIGS. 15A to 15C are diagrams for describing a change in screen ratio based on an exposed region of a display unit according to an embodiment of the present invention. All or a portion of an exposed region of the display unit 220 is used depending on a case where a region of the display unit 220 exposed to the outside is small as in FIG. 15A, a case where a region of the display unit 220 exposed to the outside increases a little more as in FIG. 15B, and a case where a region of the display unit 220 exposed to the outside increases maximally as in FIG. 15C. Accordingly, a screen is displayed on the display unit 220 exposed at a screen ratio which is convenient for a user to watch.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Embodiments of the present invention may be applied to mobile terminals using a display capable of being rolled.

The invention claimed is:

1. A mobile terminal comprising:
a flexible display;
an intermediate case including an opening;
an internal case within the intermediate case for rolling the flexible display in and out of the intermediate case through the opening;
a first case covering one end of the intermediate case;
a second case covering the other end of the intermediate case;
a first magnetic member provided within an interior of the intermediate case; and
a plurality of second magnetic members provided under the flexible display such that the flexible display is rolled by an attractive force between the plurality of second magnetic members and the first magnetic member,
wherein each of the plurality of second magnetic members has a same plurality which is opposite from a polarity of the first magnetic member.

2. The mobile terminal of claim 1, wherein the internal case has a circular shape and is concentric with the intermediate case, and the flexible display is rolled along an outer surface of the internal case.

3. The mobile terminal of claim 1, further comprising:
a first shaft provided between the first case and the intermediate case; and
a second shaft provided between the second case and the intermediate case,
wherein the first shaft and the second shaft have a cylindrical shape with both ends open.

4. The mobile terminal of claim 3, wherein one end of the first shaft is fixed to the first case, and one end of the second shaft is fixed to the second case.

5. The mobile terminal of claim 3, wherein the first magnetic member is provided on an outer surface of each of the first and second shafts.

6. The mobile terminal of claim 3, further comprising:
a circuit board and a battery in the intermediate case;
a plurality of elements within the intermediate case between the first case and the second case; and
first and second flexible circuit boards provided along an inside of the first and second shafts to electrically connect the plurality of elements to the circuit board.

7. The mobile terminal of claim 6, wherein the circuit board comprises two or more boards, and the two or more boards are electrically connected to each other by a flexible connection part.

8. The mobile terminal of claim 1, wherein an outer surface of the internal case includes a plurality of first projections,
wherein an inner surface of the intermediate case includes a plurality of second projections, and
wherein the first and second projections are concave-convex coupled to each other.

9. The mobile terminal of claim 8, wherein one end of a corresponding first projection protrudes from the outer surface of the internal case, and another end is bent from the one end to the internal case and is spaced apart from the internal case, and
wherein the plurality of first projections are elastic.

10. The mobile terminal of claim 1, further comprising:
two or more hall sensors in the internal case along a circumference direction of the internal case and configured to sense a variation of a magnetic force in the circumference direction of the internal case.

11. The mobile terminal of claim 10, wherein the two or more hall sensors are provided in the internal case along a radius direction of the internal case and further sense a variation of a magnetic force in the radius direction.

12. The mobile terminal of claim 10, wherein the hall sensor calculates a size of a region of the flexible display exposed to the outside, and
wherein the flexible display displays a screen at a screen ratio suitable for the calculated size of the region of the flexible display.

13. The mobile terminal of claim 1, further comprising:
first and second speakers respectively provided in the first and second cases.

14. The mobile terminal of claim 1, further comprising:
a camera and a speaker provided in a recessed portion including a planar surface on a surface of the first case or the second case.

15. The mobile terminal of claim 1, wherein the plurality of second magnetic members are provided on a sheet on a bottom of the flexible display, and
wherein the sheet includes silicon or thermoplastic poly urethane (TPU).

16. The mobile terminal of claim 1, wherein the first magnetic member is provided on an inner surface of the internal case in a cylindrical shape.

17. The mobile terminal of claim 1, further comprising:
a first display holder on an inner end of the flexible display and being fixed to the internal case, and
a second holder on an outer end of the flexible display and hanging on the intermediate case.

18. The mobile terminal of claim 1, further comprising:
a flexible circuit board connected to an inner end of the flexible display,
wherein the internal case includes an opening for receiving the flexible circuit board to electrically connect the flexible display to the circuit board.

19. The mobile terminal of claim 1, further comprising:
an antenna in the first case or the second case.

* * * * *